(12) United States Patent
Jungreis et al.

(10) Patent No.: US 6,535,403 B1
(45) Date of Patent: Mar. 18, 2003

(54) SYSTEMS AND METHODS FOR INVERTER WAVEFORM SMOOTHING

(75) Inventors: Aaron M. Jungreis, Cary, NC (US); David L. Dickmander, Cary, NC (US); Jeffery Parker, Zebulon, NC (US)

(73) Assignee: ABB Technology AG, Zurich (CH)

(*) Notice: Subject to any disclaimer, the term of this patent is extended or adjusted under 35 U.S.C. 154(b) by 0 days.

(21) Appl. No.: 09/932,773

(22) Filed: Aug. 17, 2001

(51) Int. Cl.[7] ............................................ H02M 1/12
(52) U.S. Cl. ................................................... 363/42
(58) Field of Search .......................... 363/132, 98, 41, 363/42, 56.02, 56.03, 56.04, 56.05

(56) References Cited

U.S. PATENT DOCUMENTS

| | | | |
|---|---|---|---|
| 3,950,691 A | | 4/1976 | Ohba ............................ 321/11 |
| 4,502,106 A | * | 2/1985 | Glennon ...................... 363/132 |
| 5,168,437 A | | 12/1992 | Gyugyi et al. ................. 363/42 |
| 5,625,548 A | * | 4/1997 | Gold et al. ..................... 363/98 |
| 6,154,379 A | * | 11/2000 | Okita ............................ 363/40 |

OTHER PUBLICATIONS

N. Mohan, T. Undeland, W. Robbins, Power Electronics—Converters, No month Applications, and Design, Wiley & Sons, New York, NY 1995, pp. 236–239.

A. Lindberg, PWM and Control of Two and Three Level High Power Voltage Source Converters, Royal Institute of Technology, Dept. of Electrical Engineering, Stockholm, Sweden, 1995 (Ph. D. Thesis), p. 119. No month.

* cited by examiner

Primary Examiner—Shawn Riley
(74) Attorney, Agent, or Firm—Woodcock Washburn LLP

(57) ABSTRACT

Notching in a switch-mode converter is compensated for to restore a sinusoidal output voltage waveform to the output of the converter, regardless of the load current level, power level, or power factor (both distortion and displacement power factor). Waveform smoothing for a waveform in a switch-mode converter having a DC bus voltage and an output filter inductance comprises determining a ripple current in the converter; determining a time-to-zero; determining a turn-on time; determining the lesser of the time-to-zero and the turn-on time; determining a duty cycle modification based on the lesser of the time-to-zero and the turn-on time; and applying the duty cycle modification to the waveform.

25 Claims, 4 Drawing Sheets

SYSTEMS AND METHODS FOR INVERTER WAVEFORM SMOOTHING

FIELD OF THE INVENTION

The present invention relates in general to switch-mode converters and, more particularly, to compensation of voltage loss at the output of switch-mode converters.

BACKGROUND OF THE INVENTION

Switch-mode converters employing pulse width modulation (PWM) are widely used for dc-dc and dc-ac applications. In one example, a switch-mode converter is used in a dc-ac inverter configuration to produce a power-frequency sinusoidal waveform. Delays in device turn-on are present in this type of converter, and are typically of two types: (1) intentional (programmed) delays to avoid simultaneous conduction (shoot-through) of the upper and lower switching devices; and (2) delays associated with the turn-on characteristics of the switching devices and reverse recovery characteristics of the parallel diodes. These two types of delay combine to produce an effective voltage loss at the output of the converter. This voltage loss depends on switching conditions and can therefore show up in the output waveform as a notch, which causes a departure from purely sinusoidal conditions.

The notch phenomenon has been explored by others with a focus on operation of the converter at high (rated) power levels. The prior art compensates for the notching at high power levels by adding a small compensating voltage with polarity determined from measurement of the load current polarity. However, the prior art does not address aspects of the notching behavior that are seen readily only at lower converter voltage or power levels. Because the analysis presented by the prior art is incomplete, the solutions described therein are also incomplete. Solutions based solely on load current polarity are inadequate for notch correction at low converter power levels.

Thus, there is a need to compensate for notching in a way that restores a substantially pure sinusoidal output voltage waveform to the output of a converter, regardless of the load current level or power level.

SUMMARY OF THE INVENTION

The present invention is directed to systems and methods of compensating for notching in a way that restores a substantially pure sinusoidal output voltage waveform to the output of a converter, regardless of the load current level, power level, or power factor (both distortion and displacement power factor).

According to an embodiment of the invention, a method of waveform smoothing for a waveform in a switch-mode converter having a DC bus voltage and an output filter inductance comprises determining a ripple current in the converter; determining a time-to-zero; determining a turn-on time; determining the lesser of the time-to-zero and the turn-on time; determining a duty cycle modification based on the lesser of the time-to-zero and the turn-on time; and applying the duty cycle modification to the waveform.

According to another embodiment of the invention, a switch-mode converter system comprises a first half-bridge connected to an LC circuit comprising an output filter inductor and an output filter capacitor and adapted to generate a pulse width modulation (PWM) output voltage having a distorted output voltage waveform; an input voltage source connected in parallel with the first half-bridge; a bus capacitor connected in parallel with the input voltage; and a controller adapted to determine a ripple current and compensate for the distorted output voltage waveform responsive to the ripple current.

According to aspects of the invention, a second half-bridge is connected in parallel with the first half-bridge, the input voltage source is connected in parallel with the first and second half-bridges, and the second half-bridge is connected to the LC circuit. According to other aspects of the invention, the second half-bridge is connected to another LC circuit.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention relates to the application of a switch-mode converter in a dc-ac inverter configuration that produces a power-frequency sinusoidal waveform. Notching is compensated for, such that a substantially pure sinusoidal output voltage waveform is provided, regardless of the load current level, power level, or power factor (both distortion and displacement power factor).

Figure 1:
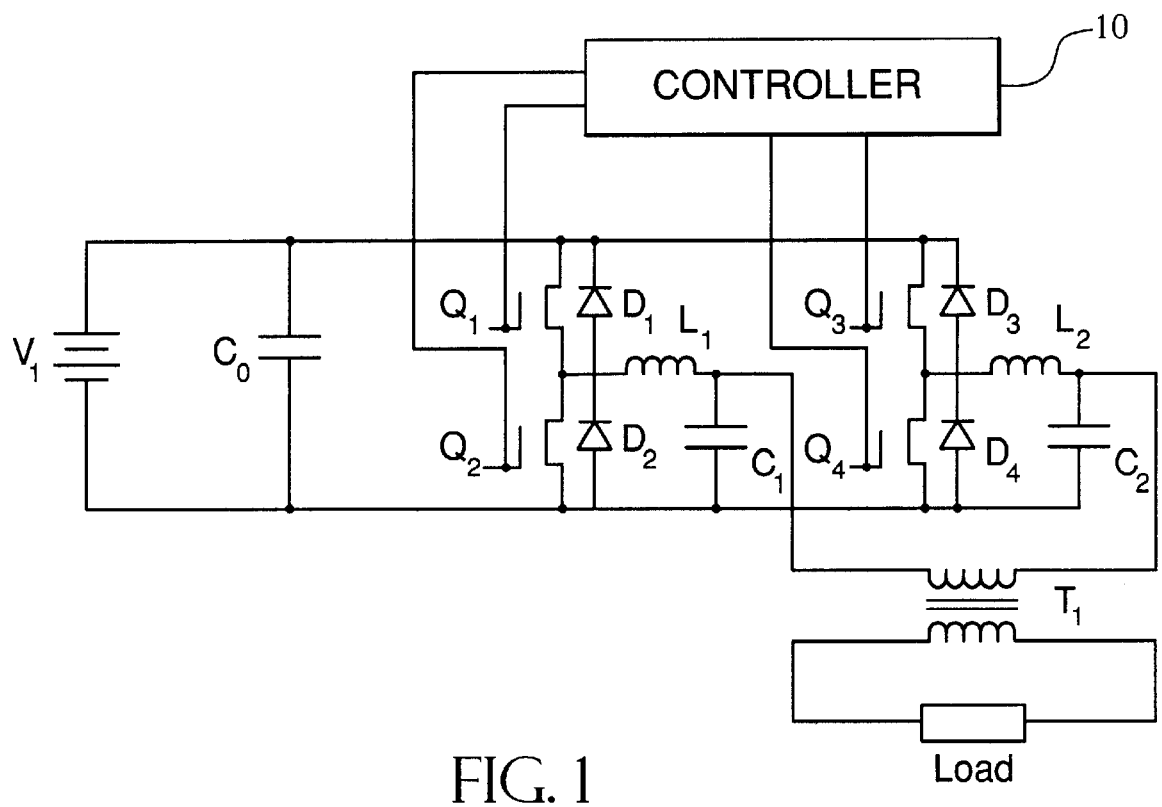
FIG. 1 is a schematic circuit diagram of an exemplary inverter system that is helpful in explaining the present invention.

FIG. 1 is a schematic circuit diagram of an exemplary inverter that is helpful in explaining the present invention. The converter shown is a single-phase full-bridge inverter. Each of the two half-bridges shown in FIG. 1 produces a high-frequency PWM output voltage that, when filtered by the LC circuits shown, results in a sinusoidal power frequency voltage at the output terminals. The converter is controlled in such a way that the power frequency voltages produced at the two terminals are phase shifted 180 degrees, resulting in a total output voltage with amplitude twice that of each half-bridge.

The inverter of the system of FIG. 1 comprises an input voltage source $V_1$, a bus capacitor $C_0$, two half-bridges (such as those shown in FIG. 2) comprising transistors $Q_1$ and $Q_2$ or comprising transistors $Q_3$ and $Q_4$, output filter inductors $L_1$ and $L_2$, output filter capacitors $C_1$ and $C_2$, an optional transformer $T_1$, and a load. A controller 10 controls the inverter in accordance with the present invention. The controller 10 can be a micro-processor, for example, or any other programmable control device that can implement the methods described herein.

A half-bridge comprises two semiconductor switches in series that are either ON or OFF. The two semiconductor switches comprising a half-bridge are preferably not turned on simultaneously because that would result in a short-circuit across the dc bus (this condition is also referred to as a shoot-through). When the upper semiconductor switch is ON, the output of the bridge is tied to the positive side of the dc bus. When the lower semiconductor switch in ON, the output of the bridge is tied to the negative side of the dc bus. Power semiconductor components typically contain an anti-parallel diode which allows current to flow in the reverse direction through the switch even when the switch is not being gated. Since the half-bridges carry inductive load current, the current coming out of the half-bridge will remain continuous. When a switch is turned OFF, the current that was flowing through that switch will instead flow through the anti-parallel diode of the other switch.

Because simultaneous conduction of the upper and lower switching devices in a half-bridge would short-circuit the dc bus (shoot-through), a programmed delay is included between the turn-off of one device and the turn-on of the other device in each half-bridge. This delay (referred to as the deadband, dead time, or blanking time) along with other delays associated with device turn-on and diode reverse recovery characteristics, results in a small time interval during the PWM cycle in which neither the upper nor the lower switching device is carrying current. During this small time interval, for example about 1 $\mu$s, the current is carried entirely by the anti-parallel diodes (or MOSFET body diodes), and the voltage during this short time depends on the direction of the inductor current.

Figure 2:
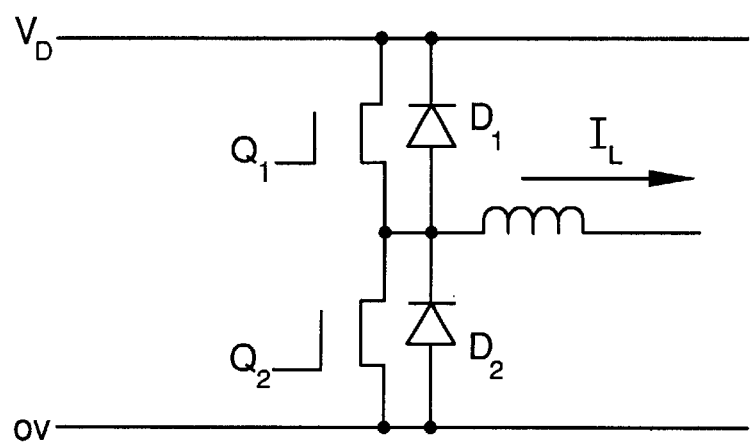
FIG. 2 is a schematic circuit diagram of an exemplary half-bridge in accordance with the present invention.

FIG. 2 is a schematic circuit diagram of an exemplary half-bridge in accordance with the present invention. Referring to FIG. 2, positive inductor current $I_L$ (i.e., flowing into the load) flows through diode D2 (during the deadband) and therefore connects the output terminal to the zero volt dc bus, resulting in a small net loss of output voltage during that short time interval. Negative inductor current (away from the load) connects the output terminal to the high voltage dc bus through diode D1 (during the deadband), resulting in a small net gain of output voltage during the short time interval.

Figure 3A:
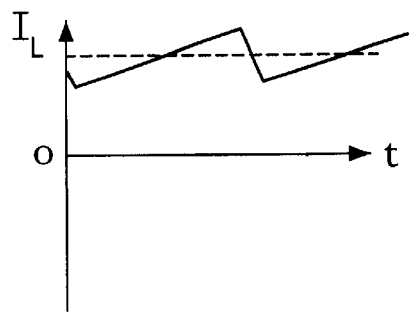
FIGS. 3A, 3B, 3C, and 3D show various inductor current waveshapes for explaining various scenarios in accordance with the present invention.
Figure 3B:
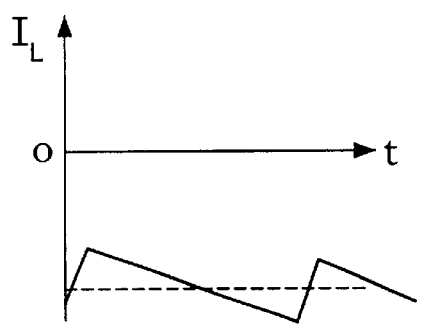
Figure 3C:
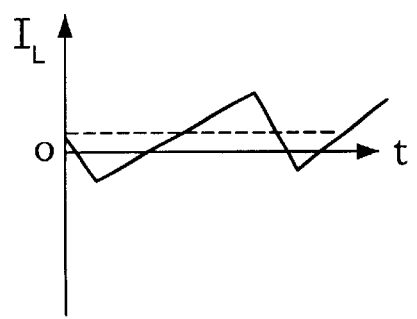
Figure 3D:
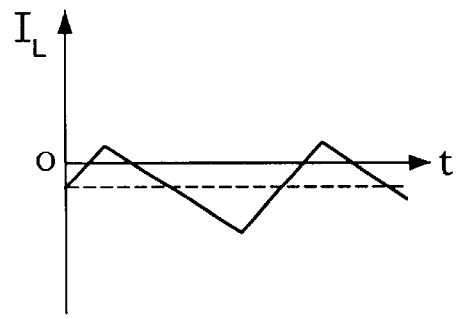

FIGS. 3A, 3B, 3C, and 3D show various inductor current waveshapes, including ripple caused by PWM switching, for explaining various scenarios in accordance with the present invention. Several scenarios exist for the inductor current waveshape. In FIG. 3A, the load current is high enough that the total current (load current plus ripple current) is always positive. In FIG. 3B, the load current is negative, and the total current is always negative. In FIGS. 3C and 3D, the magnitude of the load current is less than the ripple current, resulting in both positive and negative intervals. Based on the reasoning described above, the current in FIG. 3A should produce a net loss in output voltage, and the current in FIG. 3B should produce a net gain in output voltage. The current in FIGS. 3C and 3D produces a net loss in output voltage during the positive interval and a net gain in output voltage during the negative interval, resulting in virtually zero net effect over the complete PWM cycle.

On any given PWM cycle, the inductor current in an inverter or a converter contains a component of ripple superimposed on a large component of current. FIGS. 3A–3D show several possible operating conditions. The present invention compensates for the effect of the operating conditions, in particular the ripple. The specific operating condition depends on the relative magnitudes of the average (for a single PWM cycle) inductor current and the ripple component of the current. If the inductor ripple is greater than the magnitude of load current, then the inductor current would look like that shown in FIGS. 3A or 3B; if the inductor ripple is less than the magnitude of load current, then the inductor current looks like that shown in FIGS. 3C or 3D.

Figure 4:
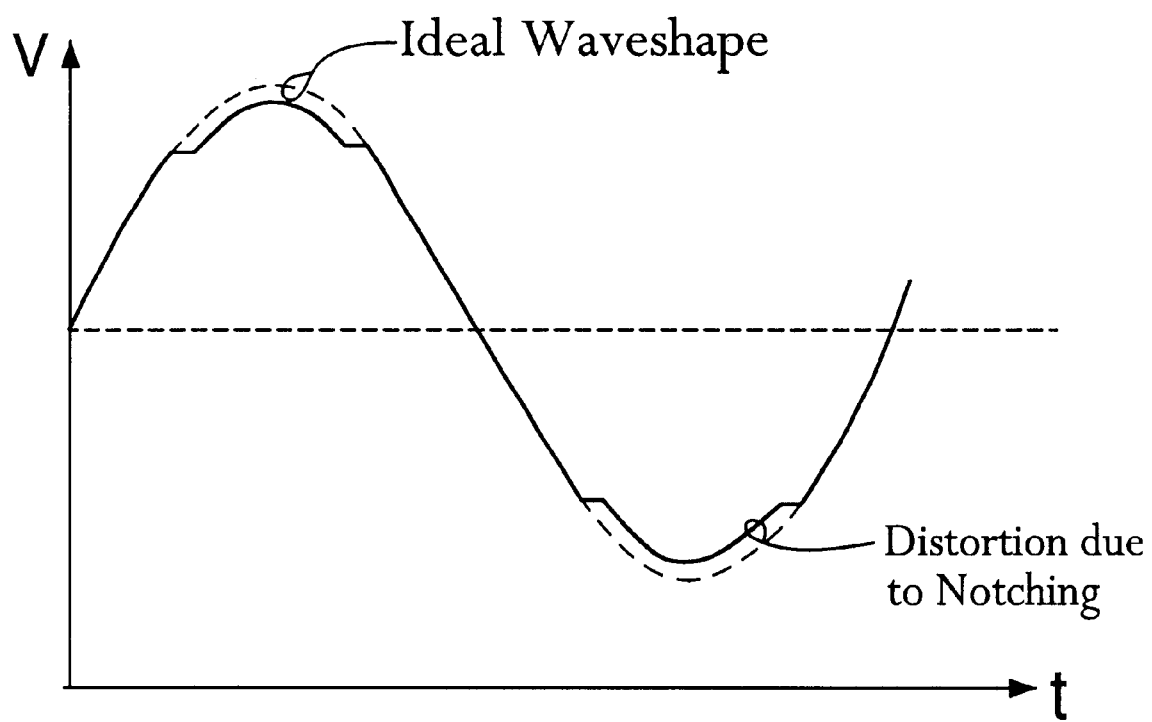
FIG. 4 shows an exemplary output voltage waveshape with notching.

FIG. 4 shows an exemplary output voltage waveshape with notching. The above-described behaviors result in distortion of the output voltage waveform as shown in FIG. 4. As described above, a net voltage loss occurs when the current is positive and its magnitude exceeds the ripple current magnitude. A net voltage gain occurs (output voltage less negative than it would otherwise be) when the current is negative and its magnitude exceeds the ripple current magnitude. During the interval when the load current is small, the voltage gains cancel the voltage losses during switching, resulting in zero net effect on the output waveform.

The above description of the output waveform distortion is correct regardless of the load level. Correction of the output voltage distortion therefore preferably includes determination of the inductor current in order to give accurate results for low load current. The compensating algorithms described by others are overly simplistic in that they include only detection of load current polarity without consideration of the inductor ripple current. For this reason, these techniques cannot be accurate for low output power levels. Furthermore, the compensating techniques described by others set forth a small fixed voltage compensation that is applied dependent solely on the current polarity. The present invention includes sufficient accuracy to compensate for the voltage distortion, with consideration of relevant factors. The inventors have determined the following relationships that are implemented by the controller 10 to compensate for the voltage distortion.

Equation (1) describes a relationship for determining the ripple current, where $I_{ripple}$ is the ripple current.

$$I_{ripple} = D(1-D)\frac{V_d}{2Lf_c} \quad (1)$$

where D is the duty cycle ($0 \leq D \leq 1.0$), $V_d$ is the DC bus voltage, L is the output filter inductance, and $f_c$ is the PWM switching frequency. In equation (1), the effect of load current change during PWM switching cycle is ignored.

Equation (2) describes a relationship for determining the ripple current, and includes the effect of load current change during PWM switching cycle:

$$I_{ripple} = \frac{V_d}{8Lf_c}\left[1 - \frac{4L^2}{V_d^2}\left(\frac{V_1}{L} + \frac{dI_{load}}{dt}\right)^2\right] \quad (2)$$

where $$V_1 = \frac{V_d}{2}(2D-1)$$

For high PWM switching frequencies, the load current does not change significantly during the PWM switching cycle, and equation (1) may be used. For lower PWM switching frequencies, it is desirable to include the effect of load current change over the switching cycle, and equation (2) is preferably used.

Prediction of time-to-zero (time required for inductor current to turn off) is given by equation (3).

$$T_{zero} = \frac{L}{DV_d}(|I_{load}| - I_{ripple}) \quad (3)$$

Equation (4) is used to determine the time-to-on-state, including programmed dead time, device turn on characteristic, and diode reverse recovery characteristic.

$$T_{on} = T_{DT} + \frac{(|I_{load}| - I_{ripple} + I_{RR})}{dI_{device}/dt} \quad (4)$$

where $T_{DT}$ is the programmable dead time delay, $I_{RR}$ is the parallel diode reverse recovery current, and $dI_{device}/dt$ is the switching device turn-on di/dt.

Determination of change in duty cycle to apply in order to compensate for voltage-loss due to notching is given by equation (5).

$$\Delta D = T_{on} * f_c \quad (5)$$

Figure 5:
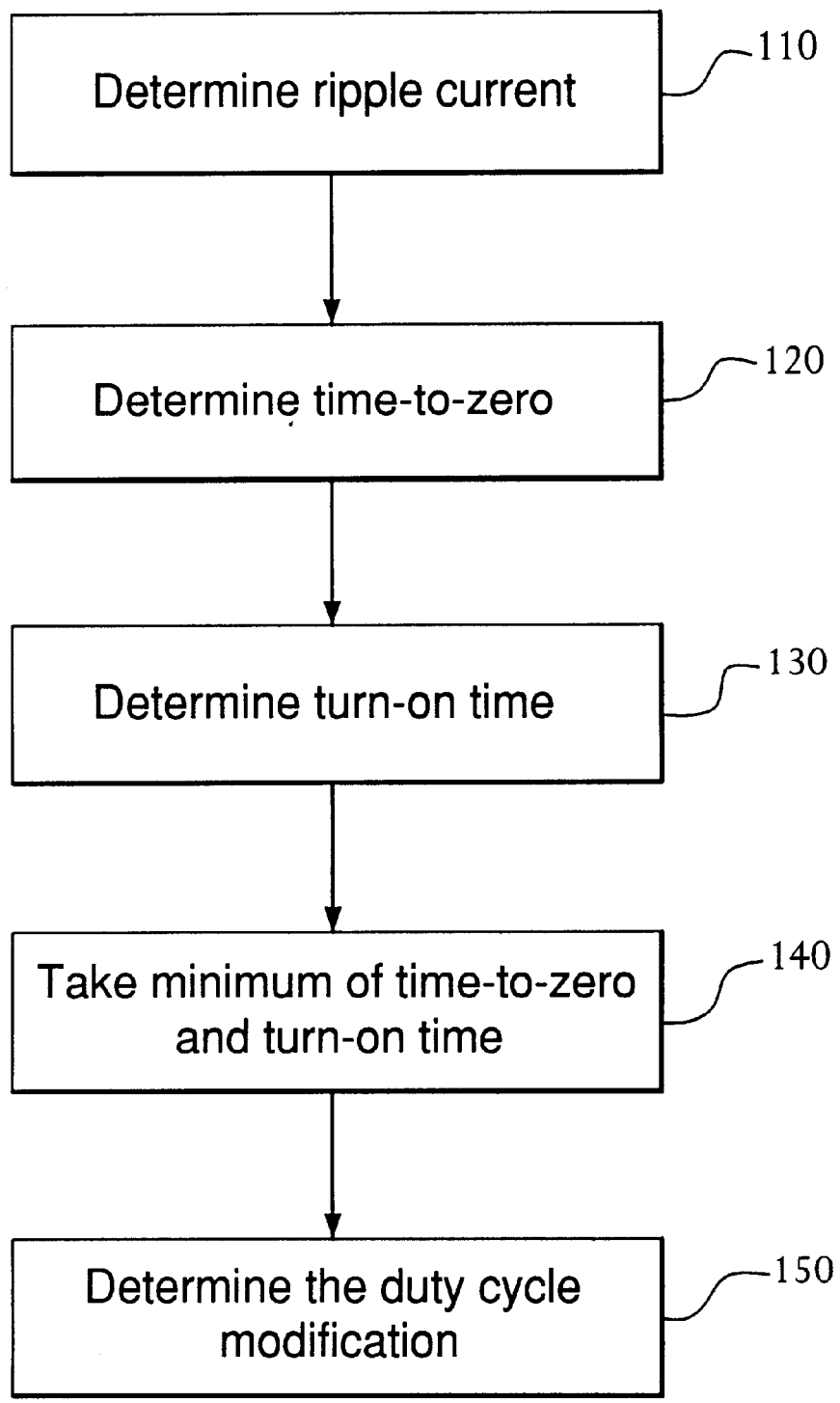
FIG. 5 is a flowchart of an exemplary method of waveform smoothing in accordance with the present invention.

FIG. 5 is a flowchart of an exemplary method of waveform smoothing (i.e., correction for voltage distortion due to notching) in accordance with the present invention. The ripple current is determined at step 110 using either equation (1) or (2). The time-to-zero is determined using equation (3) at step 120. (Note: for symmetry, it is desirable to use D during positive half-cycle of output voltage, and (1−D) during negative half-cycle.) The turn-on time is then determined at step 130 using equation (4). The minimum of time-to-zero (equation (3)) and turn-on time (equation (4)) is then taken at step 140. This operation gives a gradual correction of waveform distortion as load current begins to exceed ripple current. The time value from step 140 is used to determine the duty cycle modification at step 150 (equation (5)). This technique can be used in any converter or inverter which is capable of supporting bi-directional current flow and uses dead-time delay in operating its semiconductor switches (such as would be done for an inverter/converter comprising a half-bridge).

The present invention has been used with a residential power system (RPS) converter and correctly restores the output voltage waveform to a sinusoid regardless of the load current amplitude. It is contemplated that the present invention is implemented in DSP converter control software.

Although illustrated and described herein with reference to certain specific embodiments, the present invention is nevertheless not intended to be limited to the details shown. Rather, various modifications may be made in the details within the scope and range of equivalents of the claims without departing from the invention.

What is claimed:

1. A method of waveform smoothing in a switch-mode converter comprising a plurality of semiconductor switches having a DC bus voltage and an output filter comprising a filter inductance, comprising:

determining an amplitude of the filter inductance ripple current due to switching in the converter;

determining a filter inductance average current for a single pulse width modulation (PWM) cycle;

determining a turn-on delay time;

determining a duty cycle modification based on the turn-on delay time; and applying the duty cycle modification to the duty cycle when the filter inductance average current exceeds the amplitude of the filter inductance ripple current.

2. The method of claim 1, wherein determining the amplitude of the ripple current comprises determining the amplitude of the ripple current in accordance with:

$$I_{ripple} = D(1-D)\frac{V_d}{2Lf_c}$$

where $I_{ripple}$ is the amplitude of the ripple current, D is a duty cycle, $V_d$ is a DC bus voltage, L is the output filter inductance, and $f_c$ is a pulse width modulation (PWM) switching frequency.

3. The method of claim 1, wherein determining the amplitude of the ripple current comprises determining the amplitude of the ripple current in accordance with:

$$I_{ripple} = \frac{V_d}{8Lf_c}\left[1 - \frac{4L^2}{V_d^2}\left(\frac{V_1}{L} + \frac{dI_{load}}{dt}\right)^2\right]$$

where $$V_1 = \frac{V_d}{2}(2D-1)$$

and where $I_{ripple}$ is the amplitude of the ripple current, D is a duty cycle, $V_d$ is the DC bus voltage, L is the filter inductance, $I_{load}$ is the load current at the output of the output filter, and $f_c$ is a PWM switching frequency.

4. The method of claim 1, wherein determining the time-to-zero comprises determining the time-to-zero in accordance with:

$$T_{zero} = \frac{L}{DV_d}(|I_{load}| - I_{ripple})$$

where $I_{ripple}$ is the amplitude of the ripple current, D is a duty cycle, $V_d$ is the DC bus voltage, L is the filter inductance, $f_c$ is a PWM switching frequency, and $I_{load}$ is the load current at the output of the output filter.

5. The method of claim 1, wherein determining the turn-on time comprises determining the turn-on delay time in accordance with:

$$T_{on} = T_{DT} + \frac{(|I_{load}| - I_{ripple} + I_{RR})}{dI_{device}/dt}$$

where $T_{DT}$ is the programmable dead time delay, $I_{RR}$ is the anti-parallel diode reverse recovery current, $dI_{device}/dt$ is the switching device turn-on di/dt, $I_{ripple}$ is the amplitude of the ripple current, and $I_{load}$ is the load current at the output of the output filter.

6. The method of claim 1, wherein determining the duty cycle modification comprises determining the duty cycle modification in accordance with:

$$\Delta D = T_{on} * f_c$$

where $T_{on}$ is the turn-on delay time and $f_c$ is a PWM switching frequency.

7. A switch-mode converter system comprising:

a first half-bridge connected to a filter circuit comprising a filter inductance;

an input voltage source connected in parallel with the first half-bridge; and a controller adapted to generate pulse width modulation (PWM) gate drive signals to the first half-bridge such that the first half-bridge switches have a turn-on delay, to determine an amplitude of a ripple current in the inductance, and a PWM-cycle average current in the inductance, and to compensate for the voltage loss due to the turn-on delay when the average current in the inductance is greater than the amplitude of the ripple current in the inductance.

8. The system of claim 1, wherein the controller is adapted to determine the amplitude of the ripple current in accordance with:

$$I_{ripple} = D(1-D)\frac{V_d}{2Lf_c}$$

where $I_{ripple}$ is the amplitude of the ripple current, D is a duty cycle, $V_d$ is a DC bus voltage, L is the output filter inductance, and $f_c$ is a pulse width modulation (PWM) switching frequency.

9. The system of claim 1, wherein the controller is adapted to determine the amplitude of the ripple current in accordance with:

$$I_{ripple} = \frac{V_d}{8Lf_c}\left[1 - \frac{4L^2}{V_d^2}\left(\frac{V_1}{L} + \frac{dI_{load}}{dt}\right)^2\right]$$

where $$V_1 = \frac{V_d}{2}(2D-1)$$

and where $I_{ripple}$ is the amplitude of the ripple current, D is a duty cycle, $V_d$ is a DC bus voltage, L is the filter inductance, $I_{load}$ is the load current at the output of the filter circuit, and $f_c$ is a PWM switching frequency.

10. A switch-mode converter system comprising:
a half-bridge connected to a filter circuit comprising a filter inductance;
an input voltage source connected in parallel with the half-bridge; and
a controller adapted to generate pulse width modulation (PWM) gate drive signals to the half-bridge such that the half-bridge switches have a turn-on delay, to determine an amplitude of a ripple current in the inductance, and a PWM-cycle average current in the inductance, to determine a time-to-zero for the current in the inductance, determine a turn-on delay time, determine the lesser of the time-to-zero and the turn-on delay time, determine a duty cycle modification based on the lesser of the time-to-zero and the turn-on delay time, and apply the duty cycle modification to the duty cycle when the average current in the inductance is greater than the amplitude of the ripple current in the inductance.

11. The system of claim 10, wherein the controller is adapted to determine the time-to-zero in accordance with:

$$T_{zero} = \frac{L}{DV_d}(|I_{load}| - I_{ripple})$$

where $I_{ripple}$ is the amplitude of the ripple current, D is a duty cycle, $V_d$ is a DC bus voltage, L is the filter inductance, $f_c$ is a PWM switching frequency, and $I_{load}$ is the load current at the output of the filter circuit.

12. The system of claim 10, wherein the controller is adapted to determine the turn-on delay time in accordance with:

$$T_{on} = T_{DT} + \frac{(|I_{load}| - I_{ripple} + I_{RR})}{dI_{device}/dt}$$

where $T_{DT}$ is the programmable dead time delay, $I_{RR}$ is the parallel diode reverse recovery current, $dI_{device}/dt$ is the switching device turn-on di/dt, $I_{ripple}$ is the amplitude of the ripple current, and $I_{load}$ is the load current at the output of the filter circuit.

13. The system of claim 10, wherein the controller is adapted to determine the duty cycle modification in accordance with:

$$\Delta D = T_{on} * f_c$$

where $T_{on}$ is the turn-on delay time and $f_c$ is a PWM switching frequency.

14. The system of claim 7, wherein the controller is adapted to compensate for the voltage loss regardless of a load current level, a power level, or a power factor.

15. The system of claim 7, further comprising a second half-bridge connected in parallel with the first half-bridge, wherein the input voltage source is connected in parallel with the first and second half-bridges.

16. The system of claim 15, wherein the second half-bridge is connected to the filter circuit.

17. The system of claim 15, further comprising a second filter circuit connected to the second half-bridge.

18. The method of claim 1, wherein determining the turn-on delay time comprises determining a dead-time delay in switching the semiconductor devices.

19. The method of claim 1, wherein determining the turn-on delay time comprises estimating the time required for a semiconductor switch to turn on.

20. A method of waveform smoothing in a switch-mode converter comprising a plurality of semiconductor switches having a DC bus voltage and an output filter comprising a filter inductance, comprising:

determining an amplitude of the filter inductance ripple current due to switching in the converter;
determining a filter inductance average current for a single pulse width modulation (PWM) cycle;
determining a time-to-zero for the current in the inductance;
determining a turn-on delay time;
determining the lesser of the time-to-zero and the turn-on delay time;
determining a duty cycle modification based on the lesser of the time-to-zero and the turn-on delay time; and
applying the duty cycle modification to the duty cycle when the filter inductance average current exceeds the amplitude of the filter inductance ripple current.

21. The method of claim 20, wherein determining the turn-on delay time comprises determining a dead-time delay in switching the semiconductor devices.

22. The method of claim 20, wherein determining the turn-on delay time comprises estimating the time required for one of the semiconductor devices to turn on.

23. The system of claim 7, wherein the voltage at the output of the filter connected to the first half-bridge is substantially sinusoidal with a frequency lower than the PWM switching frequency of the converter.

24. The system of claim 7, wherein the half-bridge is used as a bidirectional converter.

25. The system of claim 7, wherein the voltage at the output of the filter connected to the first half-bridge is substantially constant.

* * * * *